United States Patent
Reese et al.

(10) Patent No.: US 12,106,865 B2
(45) Date of Patent: Oct. 1, 2024

(54) METHOD AND APPARATUS FOR REAL-TIME LEARNING-BASED AUGMENTED IRRADIATION CONTROL AND OPTIMIZATION

(71) Applicant: Oregon State University, Corvallis, OR (US)

(72) Inventors: Steven R. Reese, Corvallis, OR (US); Ophir Frieder, Washington, MD (US); Mario Enrique Gomez Fernandez, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 374 days.

(21) Appl. No.: 17/236,852

(22) Filed: Apr. 21, 2021

(65) Prior Publication Data

US 2021/0358647 A1 Nov. 18, 2021

Related U.S. Application Data

(60) Provisional application No. 63/026,593, filed on May 18, 2020.

(51) Int. Cl.
*G21C 1/02* (2006.01)
*G21C 7/26* (2006.01)
(Continued)

(52) U.S. Cl.
CPC ............... *G21C 7/36* (2013.01); *G21C 7/26* (2013.01); *G21C 7/32* (2013.01); *G21C 17/00* (2013.01);
(Continued)

(58) Field of Classification Search
CPC . G21C 7/36; G21C 7/26; G21C 17/00; G21D 3/002; G21G 1/00
See application file for complete search history.

(56) References Cited

U.S. PATENT DOCUMENTS

| | | |
|---|---|---|
| 5,023,045 A | 6/1991 | Watanabe et al. |
| 5,745,382 A | 4/1998 | Vilim et al. |

(Continued)

FOREIGN PATENT DOCUMENTS

| | | | |
|---|---|---|---|
| CN | 105955069 | | 9/2016 |
| KR | 102628429 B1 | * | 1/2024 |

OTHER PUBLICATIONS

United States. Department of Energy. DOE Fundamentals Handbook: Nuclear Physics and Reactor Theory. US Department of Energy. (Year: 1993).*

(Continued)

*Primary Examiner* — Lily C Garner
(74) *Attorney, Agent, or Firm* — MUGHAL GAUDRY & FRANKLIN PC

(57) ABSTRACT

A machine-learning tool learns from sensors' data of a nuclear reactor at steady state and maps them to controls of the nuclear reactor. The tool learns all given ranges of normal operation and responses for corrective measures. The tool may train another learning tool (or the same tool) that forecasts the behavior of the reactor based on real-time changes (e.g., every 10 seconds). The tool implements an optimization technique for differing half-life materials to be placed in the reactor. The tool maximizes isotope production based on optimal controls of the reactor.

10 Claims, 9 Drawing Sheets

(51) Int. Cl.
G21C 7/32 (2006.01)
G21C 7/36 (2006.01)
G21C 17/00 (2006.01)
G21C 23/00 (2006.01)
G21D 3/00 (2006.01)
G21G 1/02 (2006.01)

(52) U.S. Cl.
CPC ............. G21C 23/00 (2013.01); G21D 3/002 (2019.01); G21G 1/02 (2013.01)

(56) References Cited

U.S. PATENT DOCUMENTS

| | | | | |
|---|---|---|---|---|
| 6,061,412 | A * | 5/2000 | Stucker | G01T 3/006 376/217 |
| 11,249,199 | B2 * | 2/2022 | Frieder | G01V 5/22 |
| 2013/0058448 | A1 * | 3/2013 | Smith | G01M 13/028 376/245 |
| 2013/0315361 | A1 * | 11/2013 | Berger | G21C 19/32 376/202 |
| 2017/0117064 | A1 * | 4/2017 | Lepine | G21C 17/00 |
| 2018/0247721 | A1 * | 8/2018 | Ono | G05B 23/0243 |
| 2018/0254109 | A1 * | 9/2018 | Cheatham, III | G06F 30/20 |
| 2019/0392959 | A1 * | 12/2019 | Sun | G21C 17/108 |

OTHER PUBLICATIONS

National Research Council (US) Committee on Medical Isotope Production Without Highly Enriched Uranium. Medical Isotope Production without Highly Enriched Uranium. Washington (DC): National Academies Press (US); 2009. 2, Molybdenum-99/Technetium-99m Production and Use. (Year: 2009).*

IAEA, Fission Molybdenum for Medical Use. IAEA-TECDOC-515. Proceedings of a Technical Committee Meeting Organized by the International Atomic Energy Agency and Held in Karlsruhe, Oct. 13-16, 1987. See the Foreword. (Year: 1987).*

Fernandez, Mario Gomez, et al. "Nuclear energy system's behavior and decision making using machine learning." Nuclear Engineering and Design 324 (2017): 27-34. (Year: 2017).*

Modro, S. M., et al. Multi-application small light water reactor final report. No. INEEL/EXT-04-01626. Idaho National Lab.(INL), Idaho Falls, ID (United States); Oregon State University, Corvallis, OR; Nexant, Inc., San Francisco, CA (US), 2003. (Year: 2003).*

Bond, D. et al., "On-Line Intelligent Self-Diagnostic Monitoring System for Next Generation Nuclear Power Plants", United States. Dept. of Energy, 2003. 270 pages.

Calivá, F. et al., "A Deep Learning Approach to Anomaly Detection in Nuclear Reactors", in: 2018 Int. Jt. Conf. Neural Networks, 2018: pp. 1-8. https://doi.org/10.1109/IJCNN.2018.8489130.

Chen, F. et al., "NB-CNN: Deep Learning-Based Crack Detection Using Convolutional Neural Network and Naïve Bayes Data Fusion", IEEE Trans. Ind. Electron. 65 (2018) 4392-4400. https://doi.org/10.1109/TIE.2017.2764844.

Gomez-Fernandez, M. et al., "Nuclear energy system's behavior and decision making using machine learning", Nucl. Eng. Des. 324 (2017) 27-34. https://doi.org/10.1016/j.nucengdes.2017.08.020.

IAEA, "Managing modernization of nuclear power plant instrumentation and control systems", IAEA, Vienna, 2004. IAEA-TECDOC-1389. ISBN 92-0-116103-4. ISSN 1011-4289 . (118 pages).

* cited by examiner

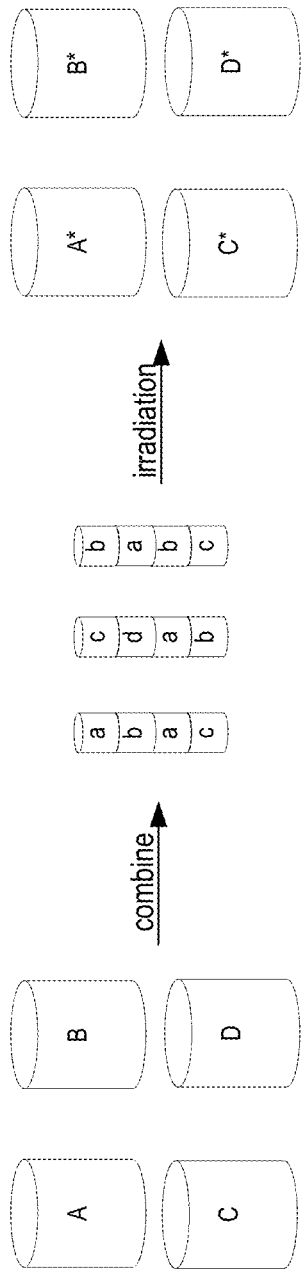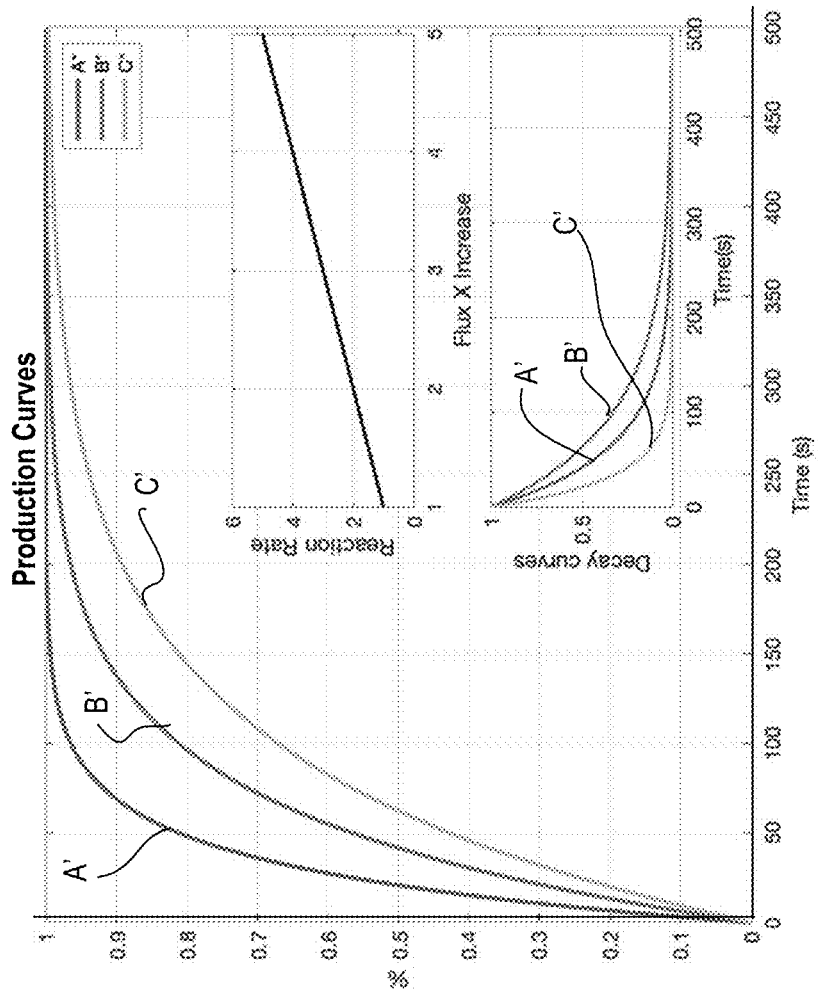
Fig. 1

METHOD AND APPARATUS FOR REAL-TIME LEARNING-BASED AUGMENTED IRRADIATION CONTROL AND OPTIMIZATION

CLAIM FOR PRIORITY

This application is a non-provisional of, and claims the benefit of priority to U.S. Provisional Patent Application No. 63/026,593, filed on May 18, 2020, titled "METHOD AND APPARATUS FOR REAL-TIME LEARNING-BASED AUGMENTED IRRADIATION CONTROL AND OPTIMIZATION," and which is incorporated by reference in entirety.

BACKGROUND

Medical radioisotopes, or radiopharmaceuticals, are commonly used throughout the world for a number of different diagnostic imaging procedures examining health issues such as heart disease, thyroid function, and cancer detection, to name a few. The production of these radioisotopes is widely understood but is a difficult process because it involves in many cases first irradiating a material in a nuclear reactor to make it radioactive. Then the irradiated material must be processed and purified such that it can be made available for human use. One issue facing the production of these radioisotopes is the operation of the reactor. Hence, ensuring that the reactor operation is optimized and that shutting down of the reactor (intentionally or otherwise) is kept to a minimum is desired.

Shutting down of a reactor is a disruptive process both for the operation but particularly to radioisotopes that are being created at the time. The reason why radioisotopes are affected so dramatically is that they are radioactive so they are constantly decaying away from the moment they are made. Some radioisotopes also tend to be extremely short-lived, meaning they decay away very quickly, which exacerbates the issue. Because of this, it is important to ensure that the reactor producing the radioisotopes to be used in radiopharmaceuticals is operated continuously in an optimized fashion. Unplanned shutdowns of the reactor result in the loss of the radioisotope availability, and this leads to higher costs downstream in the supply chain of the radiopharmaceutical.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated here, the approaches described in this section are not prior art to the claims in the present disclosure and are not admitted to be prior art by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1 illustrates a hypothetical production curve for radioisotopes A, B, C each with differing half-lives and flux increase curves on isotope production.

DETAILED DESCRIPTION

Figure 2:
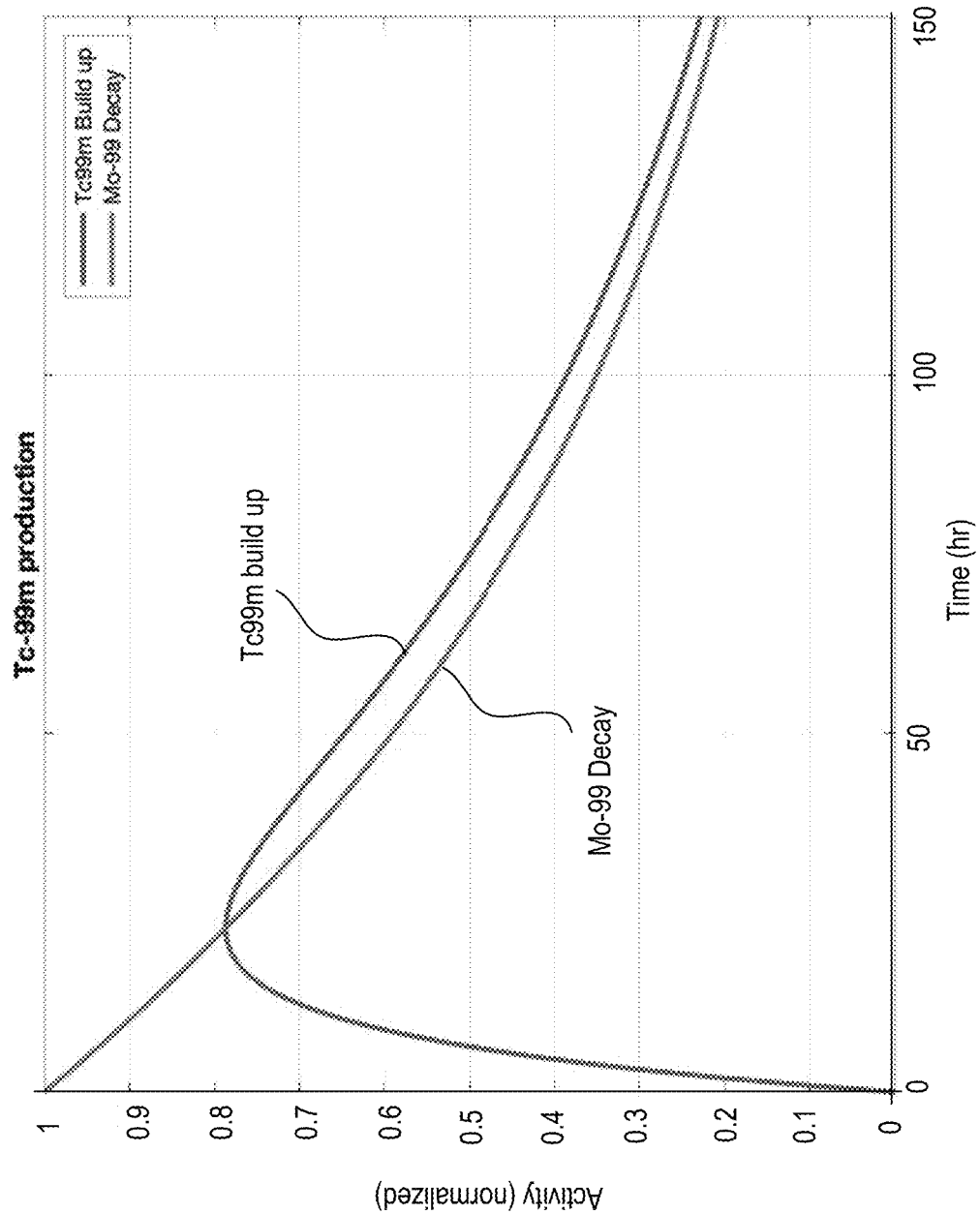
FIG. 2 illustrates a plot showing Mo-99/Tc-99m production.

One highly valued radiopharmaceutical in use today utilizes the radioisotope Technetium-99m (Tc-99m). The world-wide market value of the use of this radioisotope alone is estimated at some $13B USD. Tc-99m is used approximately 40,000 times a day in the United States to determine atrophied heart muscle through a procedure called a myocardial perfusion (commonly called a nuclear stress test) or to define the location and morphology of some tumors. The primary reason Tc-99m is used in these procedures is that it produces high-fidelity images in a way not currently possible to duplicate with other technologies, yet decays away quickly.

Tc-99m comes directly from the decay of Molybdenum-99 (Mo-99), which is what is made in the reactor by neutron bombardment of Molybdenum 98, a stable isotope (non-radioactive). The half-life (the time it takes for half of the radioisotope to decay away) of Tc-99m is approximately 6 hours. However, the half-life of its parent, Mo-99, is slightly less than 3 days (approximately 66 hours), so at the end of a week only less than 25% of the original amount of the material remains.

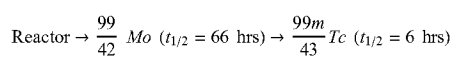

$$\text{Reactor} \rightarrow {}^{99}_{42}Mo \ (t_{1/2} = 66 \text{ hrs}) \rightarrow {}^{99m}_{43}Tc \ (t_{1/2} = 6 \text{ hrs})$$

Tc-99m comes directly from the decay of Mo-99, which is most widely produced in research reactors. The United States consumes approximately half the world's supply of Mo-99 even though there is no source in North America. To ensure an adequate supply of Tc-99m, Mo-99 is replaced each week at each location to allow for the diagnostic imaging procedures to take place. A Canadian reactor did supply North America with the majority of Mo-99 previously. However, this reactor has been shut down due to old age. The shuttering of this reactor has created an opening for a commercially viable business plan for Mo-99 production. As other old reactors scattered across the world are scheduled to be shut down, the opportunity to obtain Mo-99 becomes more difficult.

Reactors used to make electrical power may not be used to make Mo-99 for a variety of reasons. Research reactors are typically used to make Mo-99. These research reactors are used for experimental work, typically located on university campuses. One of the few reactors making Mo-99 at present is in eastern Australia, but that is about 48 hours typical travel time from the western United States. Given the short half-life of Mo-99, a 48-hour travel time is unsustainable with a domestic supplier. This means that a domestic research reactor to produce the desired radioisotope for the United States consumption, in this case Mo-99, is expected to operate continuously on a weekly basis without interruption.

When a radioisotope is created in a reactor, it builds up over time through a process called neutron activation. However, the radioisotope is also decaying away as it is being produced. This process can be described by the following equation:

$$P = N_m \sigma_a (\varphi_{th} + \varphi_{epi} + \varphi_f)(1 - e^{+\lambda_m t_a})$$  eq. 1 where P is the radioactivity produced (Bq); $N_m$ is the number of target atoms irradiated (#); $\sigma_a$ is the absorption cross section (cm$^2$); $\varphi_{th}$ is the thermal neutron flux (cm$^{-2}$ s$^{-1}$); $\varphi_{epi}$ is the epithermal neutron flux (cm$^{-2}$ s$^{-1}$); $\varphi_f$ is the fast neutron flux (cm$^{-2}$ s$^{-1}$); $\lambda_m$ is the decay constant (s$^{-1}$); and $t_a$ is the activation (irradiation) time (s). The two components of equation 1 are reaction rate and saturation rate. Reaction rate is expressed as $N\sigma_a(\Phi_{th}+\Phi_{ep}+\Phi_f)$. Saturation rate is expressed as: $(1-e^{-\lambda_m t_a})e^{-\lambda_m t_w}$.

The theoretical maximum amount of radioactivity is a function of the amount of the precursor isotope one begins with (N), the reactor cross section ($\sigma$) and the number of neutrons available in the thermal, and epithermal and fast energy range ($\phi$). For a reactor, the amount of material available and the cross section for the reaction of interest are not variables that can be changed. However, the number of neutrons of a particular energy is dependent on the location within the reactor where the sample of material is placed. There is some flexibility here depending on the energy of neutrons desired. As an example, some locations within a reactor may produce more fast neutrons than thermal neutrons. While the number of locations is usually limited, it does represent a variable that can be controlled, and therefore optimized by the reactor operator. Some embodiments address this aforementioned sample placement optimization.

Furthermore, the decay constant ($\lambda$) of the particular isotope of interest also plays a significant role in the amount produced, causing the function to approach some particular equilibrium value asymptotically. Activation time is governed by the sample's decay constant ($\lambda_m$). Optimal $t_a$ is achieved when equilibrium is reached.

FIG. 1 illustrates system 100 with a hypothetical production curve for radioisotopes A, B, C, and D each with differing half-lives and flux increase curves on isotope production. In this example, for radioisotope A the maximum is reached much sooner (as indicated by A*) than radioisotopes B and C (as indicated by B* and C*, respectively) reach their possible maximum activities. Shown in FIG. 1, the net effect is a curve that starts out very steep and flattens out over time. The rate of a radioisotope produced (put another way, how steep the production curve is) during irradiation in a reactor is primarily dependent upon the half-life as well. Radioisotopes with longer half-lives typically take longer to produce higher activities. This phenomenon is also illustrated in FIG. 1.

FIG. 2 illustrates plot 200 showing Mo-99/Tc-99m production. Given the short half-life of Mo-99, a 48-hour travel time is unsustainable with a domestic supplier. As mentioned herein, this means that a domestic research reactor to produce the desired radioisotope for the United States consumption, in this case Mo-99, is to operate continuously on a weekly basis without interruption.

It is challenging to make more than one radioisotope at the same time if one radioisotope is maximized at the expense of the other. In fact, this compromise is made at reactors that produce radioisotopes all of the time. The result is that a reactor is usually run for either a single radioisotope or perhaps another that has a comparable half-life. When the half-lives differ dramatically, a reactor will typically be forced to schedule a shutdown to change the samples. This means the reactor operating schedule is highly dependent on, if not outright determined by, the radioisotopes being produced. To maximize the utilization of the resource (i.e., the reactor), coordination and optimization of the reactor schedule and use becomes paramount.

The assumption used is that the reactor will operate continuously in support of the production of the radioisotopes and that it will experience shutdown when needed. Problems arise when the reactor experiences shutdown for unintentional reasons caused by mechanical failure, operator error and some anticipated or unanticipated change in conditions. As an example, say an operator unknowingly leaves a particular cooling pump off, allowing the water temperature in the core reactor to reach an unacceptable level, forcing the shutdown of the reactor. Say it takes 6 hours for the temperature to reduce to operating conditions. At the same time, the reactor was operating to produce a radioisotope that has a half-life of 3 hours. By the time the reactor is restarted, 75% of the radioisotope has decayed away. For a reactor that needs to operate continuously, such unplanned shutdowns should be minimized. The extreme example is a power reactor, which typically does not produce radioisotopes, but operates continuously to produce electricity. In the U.S. nuclear industry and companies, unplanned shutdowns can have a cost of approximately $48 billion per year based on a plant life of 40 years.

Current approaches to minimizing these unplanned shutdowns typically involve two items: human operators and a surveillance and maintenance program. Surveillance and maintenance programs help to reduce the number of unplanned shutdowns caused by mechanical issues by anticipating failure due to wear-and-tear or just replacing items based on mean-time-for-failure (MTFF) data. For virtually everything else, reactors typically rely on qualified human operators.

Although there are automated systems that shut the reactor down in the event an alarm threshold is reached, the system relies upon a qualified operator to recognize changing conditions and intervene when indications show that the reactor is headed for one of these thresholds. Research reactors are ideal to implement the embodiments described herein as the number of controls and monitoring instruments is limited. Power is controlled by a combination of monitoring instruments and control systems. At a research reactor, examples of control systems include: power level monitors; primary and secondary cooling heat exchanger (HX) inlet/outlet temperatures; area radiation monitors (ARMs);

air particulate and gate monitors; emissions stack air particulate and gas monitors; and primary cooling level and conductivity.

Power reactors typically have the same monitoring and control systems just on a more robust level. However, the same need to anticipate transient movement in instrumentation and correct or warn the operator before a trip level is reached still exists.

As stated, current practice of reactor sample placement and reactor control relies on a human operator. While purely computer-controlled reactor sample placement and reactor operational control is possible, as disclosed herein, computer augmented sample placement and reactor control is likewise disclosed in various embodiments. That is, either the computer controls all processing, or a computer interacts with a human to augment the human management reactor processing. In a reactor setting, a computer can either assign the sample placement and control the reactor, referred to as computer control, or a computer can suggest a sample placement and control actions for the human to follow, with the human modifying the suggestions, and thus actions, as appropriate, referred to as augmented control. Note in an alternate computer augmentation mode, the computer can directly control, with a human modifying the action as appropriate. In both cases, the computer is augmenting the human's capability, in accordance with various embodiments.

Some embodiments describe a machine-readable storage media having machine readable instructions that, when executed, cause one or more machines to perform an operation comprising collecting data from sensors of a nuclear reactor at a steady state condition. In some embodiments, the collected data includes: a temperature of primary and secondary cooling heat exchanger inlet and outlet; a power range; an area radiation; a reactor bay air particulate and gas; a stack air particulate and gas; a primary cooling level and conductivity; and/or data associated with power channels including wide-range channel, log channel, linear channel, period channel, and safety channel. In some embodiments, the sensors include: temperature sensors of heat exchanger inlet and outlet; a power range monitor; power channels; area radiation monitors; a reactor bay air particulate and gas monitor; and/or a stack air particulate and gas monitor.

In some embodiments, the operation further comprises training an optimization model with the collected data. In some embodiments, the optimization model includes:

$$P = N_m \sigma_a (\varphi_{th} + \Phi_{epi} + \Phi_f)(1 - e^{-\lambda_m t_a})$$

where, P is radioactivity produced (Bq); $N_m$ is a number of target atoms irradiated (#); $\sigma_a$ is an absorption cross section (cm$^2$); $\varphi_{th}$ is a thermal neutron flux (cm$^{-2}$ s$^{-1}$); $\varphi_{epi}$ is an epithermal neutron flux (cm$^{-2}$ s$^{-1}$); $\varphi_f$ is a fast neutron flux (cm$^{-2}$ s$^{-1}$); $\lambda_m$ is a decay constant (s$^{-1}$); and $t_a$ is an activation (irradiation) time (s). In some embodiments, training the optimization model includes applying supervised machine-learning to determine one or more of: placement of a sample material in the reactor; schedule for isotope production from the sample material; or control and monitoring of the reactor.

In some embodiments, the operation further comprises controlling the nuclear reactor in real-time, using the trained optimization model, and reporting anomalies in the nuclear reactor to an operator. In some embodiments, the operation of controlling the nuclear reactor in real-time includes performing one or more of: controlling a power flux controller; moving at least one of four rods, wherein the four rods include transient rod, safe rod, shim rod; and regulating rod; switching between operating modes, wherein the operating modes include auto mode, manual mode, pulse mode, and jump mode; controlling primary and secondary cooling flow rate; controlling secondary cooling fan speed; or controlling ventilation flow rate or differential pressure. In some embodiments, the operation further comprises predicting operational issues with the nuclear reactor to avoid unplanned shut down of the nuclear reactor. Upon such prediction, human operators and/or automated processes can attend to the predicted issue and resolve it in time to continue uninterrupted operation of the nuclear reactor.

Some embodiments disclose applications of machine-learning (also commonly referred to as data mining and deep learning) to perform tasks including: optimize the location in the reactor where a sample should be placed; schedule the irradiation for a set of radioisotopes to produce the desired activity; and/or monitor and control the reactor to minimize the disruption of the schedule. These tasks are used for material like Mo-99 since production of Mo-99 is severely limited and expensive. There are four underlying problems, among others, that are solved by the various embodiments.

First, in the expense of operating a reactor, one problem is finding the lowest amortized cost per unit of radioisotope or other produce (e.g., electricity) produced. This is a complicated problem because there are fixed costs to starting and stopping the fission reaction in addition to the variable cost of operation. The second problem is how long to permit the fission reaction to continue. The third problem is where to place in the reactor the target from which the radioisotope is created. The fourth problem is what happens when more than one radioisotope is present at the same time. Given all of the above factors, some embodiments optimize for two or more irradiations in the same run of a reactor.

Some embodiments disclose a computer real-time, learning-based augmented irradiation control and optimization. Existing methods rely strictly on human judgment and ability of threshold trip points. Various embodiments augment human capability by providing real-time computer guidance learned via supervised learning to support greater reactor throughput and efficiency. Greater reactor throughput and efficiency is achieved by preferred sample placement and reactor irradiation control that minimizes reactor shutdown. Fully-automated, real-time, computer control of a reactor is likewise disclosed.

Some embodiments disclose a method to address the above need in a way that avoids the deficiencies described in the previous section. While maximum production is achieved by maximizing the flux (i.e., at full power) sudden changes might violate operational threshold(s). Just like any other reactor, the anticipation of any sensor violation is crucial as it not merely results in production delays, but in other financial and regulatory penalties. Such need is internationally recognized for many years. Particularly for research reactors, some embodiments maximize the production of isotope production by leveraging the fundamental purpose of pattern recognition techniques to augment operators' jobs to make informed decisions on future estimates, and ultimately, maximizing production. Additionally, as previously described, some embodiments provide material optimization sequence wherein the materials scheduled for activation have different half-lives.

Some embodiments take the form of a deep learning structure that is designed for research reactors for the purpose of isotope production. Uniquely the embodiments herein integrate scientific and/or engineering fields within the Nuclear Operations, Nuclear Science and Engineering, and Computer Engineering disciplines. Some embodiments create a continuous communication between a computer and the electronics of the reactor console to optimize the operation of the nuclear reactor.

In some embodiments an apparatus is provided which comprises a control panel to collect data from sensors of a nuclear reactor at a steady state condition. The apparatus further comprises an analyzer communicatively coupled to the control panel. In some embodiments, the analyzer trains an optimization model with the collected data. In some embodiments, the analyzer predicts operational issues with the nuclear reactor to avoid unplanned shut down of the nuclear reactor. In some embodiments, the analyzer communicates with the control panel to control the nuclear reactor in real-time, using the trained optimization model, and reports anomalies in the nuclear reactor to an operator. In some embodiments, the control panel controls the nuclear reactor in real-time by control of a power flux controller. In some embodiments, the control panel controls the nuclear reactor in real-time by movement of at least one of four rods. The four rods include transient rod, safe rod, shim rod; and regulating rod. In some embodiments, the control panel controls the nuclear reactor in real-time by switching between operating modes. The operating modes include auto mode, manual mode, pulse mode, and jump mode. In some embodiments, the control panel controls the nuclear reactor in real-time by control of primary and secondary cooling flow rate. In some embodiments, the control panel controls the nuclear reactor in real-time by control of a secondary cooling fan speed. In some embodiments, the control panel controls the nuclear reactor in real-time by control of ventilation flow rate or differential pressure. Dynamic control of various parameters and/or control knobs allows to avoid unplanned shutdown of the reactor, in accordance with various embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "real-time" here generally refers to systems that respond under real-time or live constraints and generates a result within a time frame (e.g., in few or less microseconds).

The term "module" or "logic" may refer to one or more passive and/or active components, or software components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

Figure 3:
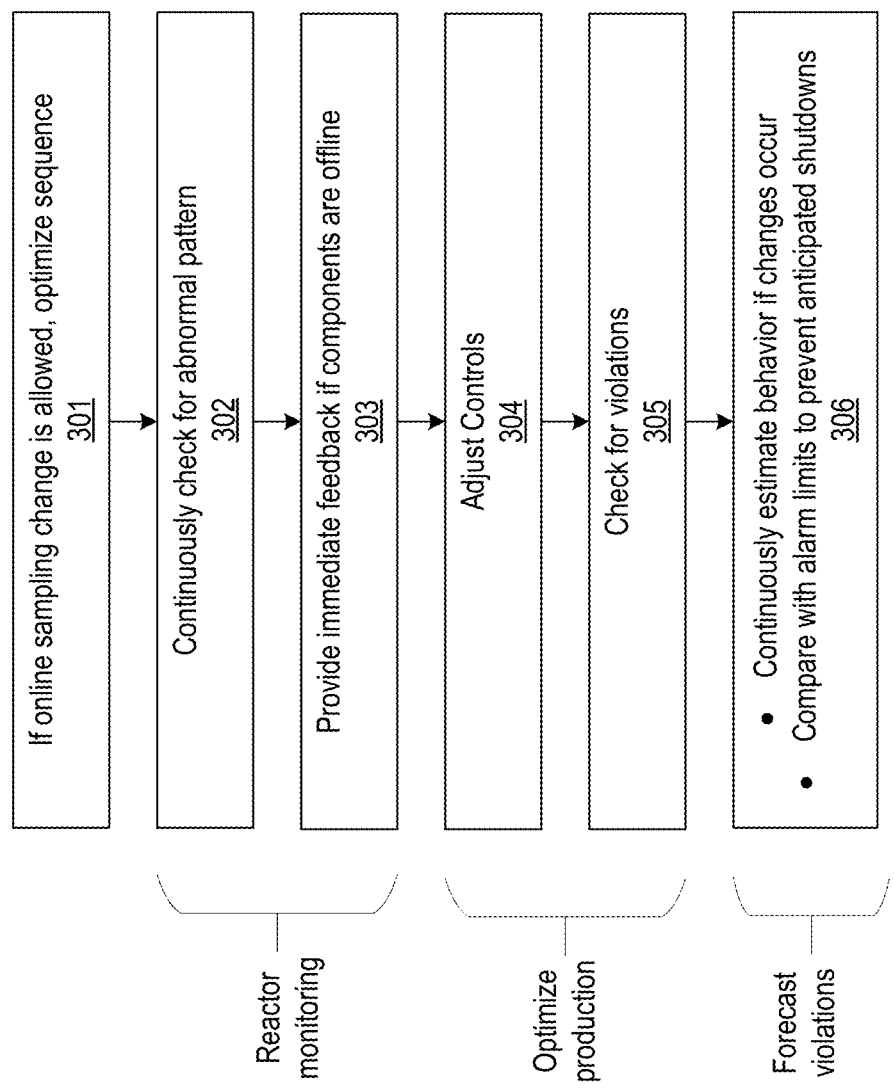
FIG. 3 illustrates a flowchart of an optimization process, in accordance with some embodiments.

FIG. 3 illustrates flowchart 300 of an optimization process, in accordance with some embodiments. While various blocks in flowchart 300 are shown in a particular order, the order can be modified. For example, some blocks may be optional, and some blocks may be performed in parallel or out of order. The blocks of various embodiments can be performed by hardware, software, or a combination of them.

Flowchart 300 gives an overview of the optimization process. The overview here is described with reference to a TRIGA® reactor. However, the embodiments are applicable to any nuclear reactor. In some embodiments, if online sampling change is allowed, the sequence of operation can be optimized as indicated by block 301. As an example, a sample used to produce a given radionuclide with a shorter half-life might best be inserted into the reaction near the end of a cycle of operation intended for producing a radionuclide with a longer half-life. In some embodiments, the sequence of samples being radiated to support optimal ordering are dynamically reordered. In some embodiments, the reordering results in increasing throughput or yield (e.g., the largest throughput or yield).

In some embodiments, data from various sensors of the reactor are continuously checked or monitored for abnormal patterns as indicated by block 302. The sensors include temperature sensors of heat exchanger inlet and outlet; a power range monitor; power channels; area radiation monitors; a reactor bay air particulate and gas monitor; and/or a stack air particulate and gas monitor. In some embodiments, the data from the various sensors include: a temperature of primary and secondary cooling heat exchanger inlet and outlet; a power range; an area radiation; a reactor bay air particulate and gas; a stack air particulate and gas; a primary cooling level and conductivity; and/or data associated with power channels including wide-range channel, log channel, linear channel, period channel, and safety channel.

Abnormal patterns are defined a priori or learned by the machine-learning tool. Such abnormal patterns are notified to the user (or operator) as well as the machine-learning tool as indicated by block 303. Examples of abnormal patterns include rise in temperature of the reactor core above its acceptable temperature range. If any one of the sensors or components of the reactor go offline, that information is provided to the operator and the machine-learning tool (also referred to as the optimization tool).

In response to determining abnormal patterns, the controls are then adjusted by the user or the optimization tool as indicated by block 304. These controls include lowering or raising the rods in the reactor core to maintain the temperature and mitigate the sensed violations. As such, current violations are resolved. Resolution of current violations are checked at block 305 to ascertain that the adjustment of controls is successful to maintain temperature of the reactor pool. In some embodiments, the optimization process also forecasts violations to prevent unanticipated shutdowns as indicated by block 306. For example, the optimization process continuously estimates behavior of the nuclear reactor and compares its outputs (e.g., sensor outputs) with alarm limits or thresholds (which are fixed or programmable) to determine any future anomaly that should be promptly handled to prevent a shutdown.

Figure 4:
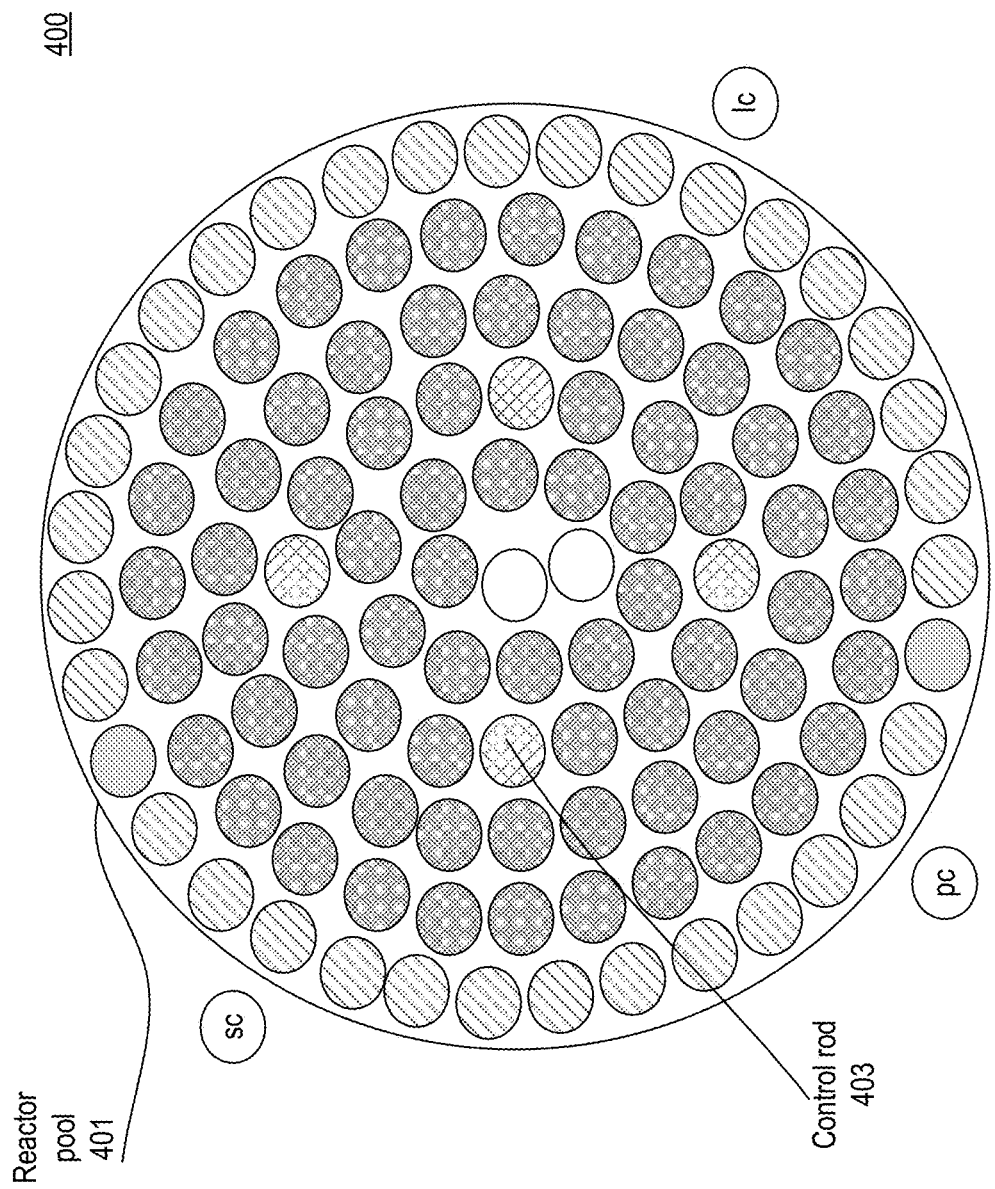
FIG. 4 illustrates a nuclear reactor core with rods controllable by the optimization process, in accordance with some embodiments.

FIG. 4 illustrates nuclear reactor core 400 with rods controllable by the optimization process, in accordance with some embodiments. The core is located inside a reactor pool 401. In this example, four control rods 403 are located in the TRIGA®, as well as the safety (sc), percentage (pc), and linear/log (lc) channels that are monitored by an operator. The heat in the reactor is controlled by controlling the position of the rods in a coolant and primary and secondary flow rates which are monitored by the heat exchanger (HX), pool levels, and conductivity.

Figure 5:
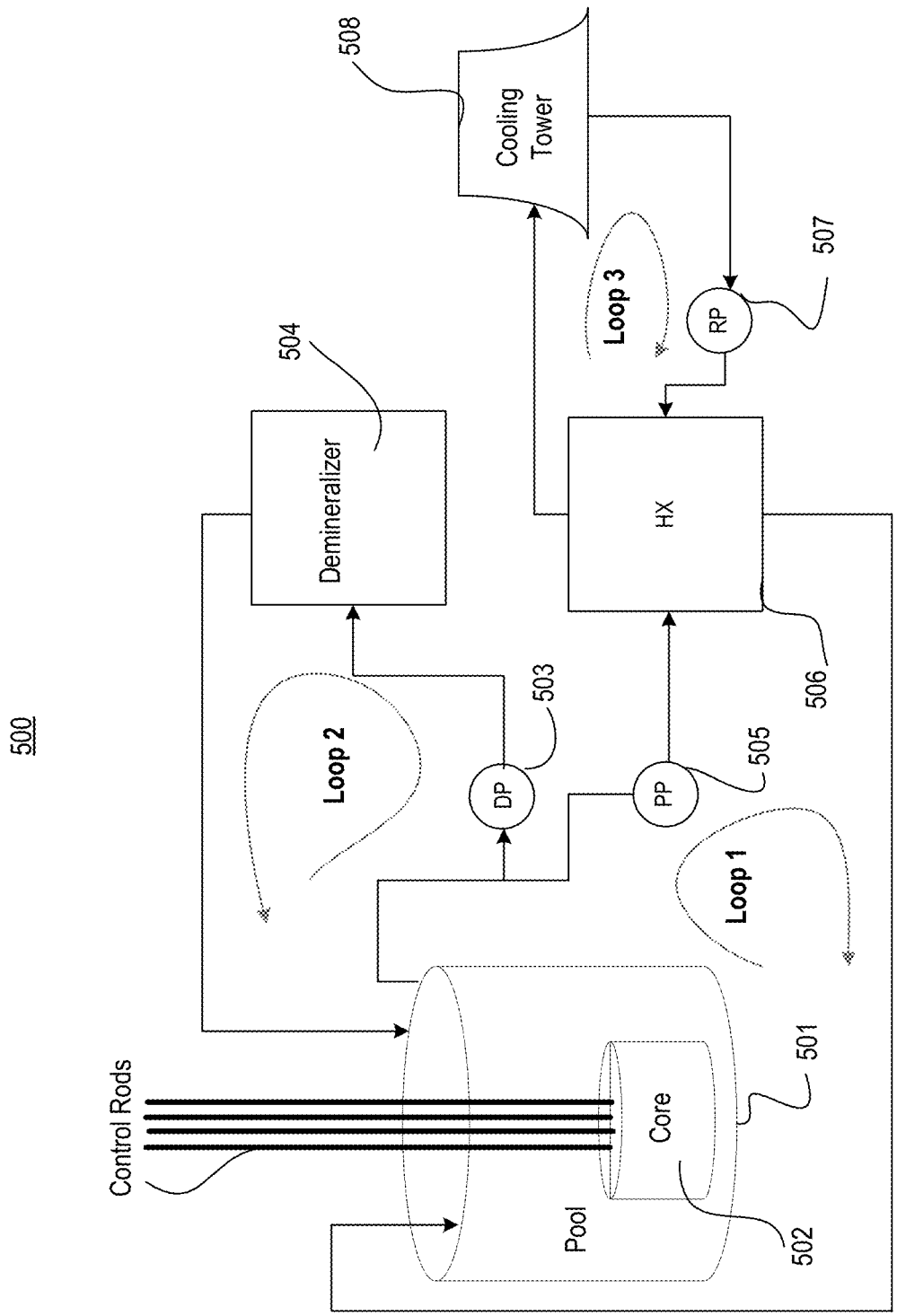
FIG. 5 illustrates a reactor system which is controllable by the optimization process, in accordance with some embodiments.

FIG. 5 illustrates reactor system 500 which is controllable by the optimization process, in accordance with some embodiments. Reactor system 500 comprises reactor pool 501, reactor core 502 having control rods (e.g., rods 403), demineralizer pump (DP) 503, demineralizer 504, primary pump (PP) 505, heat exchanger (HX) 506, recirculation pumps (RP) 507, and cooling tower 508 coupled as shown. Three loops are shown between various components of the reactor—loop1, loop2, and loop3.

Loop 1 and loop 3 are the pool water control loops which ensure that the pool water is maintained at a certain temperature range to keep the reactor cool. Here, the primary water (pool water) and the secondary water are pumped into heat exchanger (HX) 506. Controlling the primary (PP) pump 505 or other recirculation pump (RP) 507 is used to keep operating temperature of core 502 within a range. Loop 2 is the water chemistry loop which ensures that impurities are removed and keeps water conductivity at optimal levels. Adequate control of the flow rate of demineralizer pump (DP) 503 is used to ensure water quality. Loop 3 also provides cooler fluid to heat exchanger (HX) 506 via cooling tower 508 and recirculation pumps (RP) 507. Power is controlled by three monitoring instrument channels and the four control rods. One control rod is connected to a feedback relay to control power level at a demand set point. The ability to shut down the reactor (e.g., SCRAM) is determined by safety channels (e.g., 6 safety channels).

Figure 6:
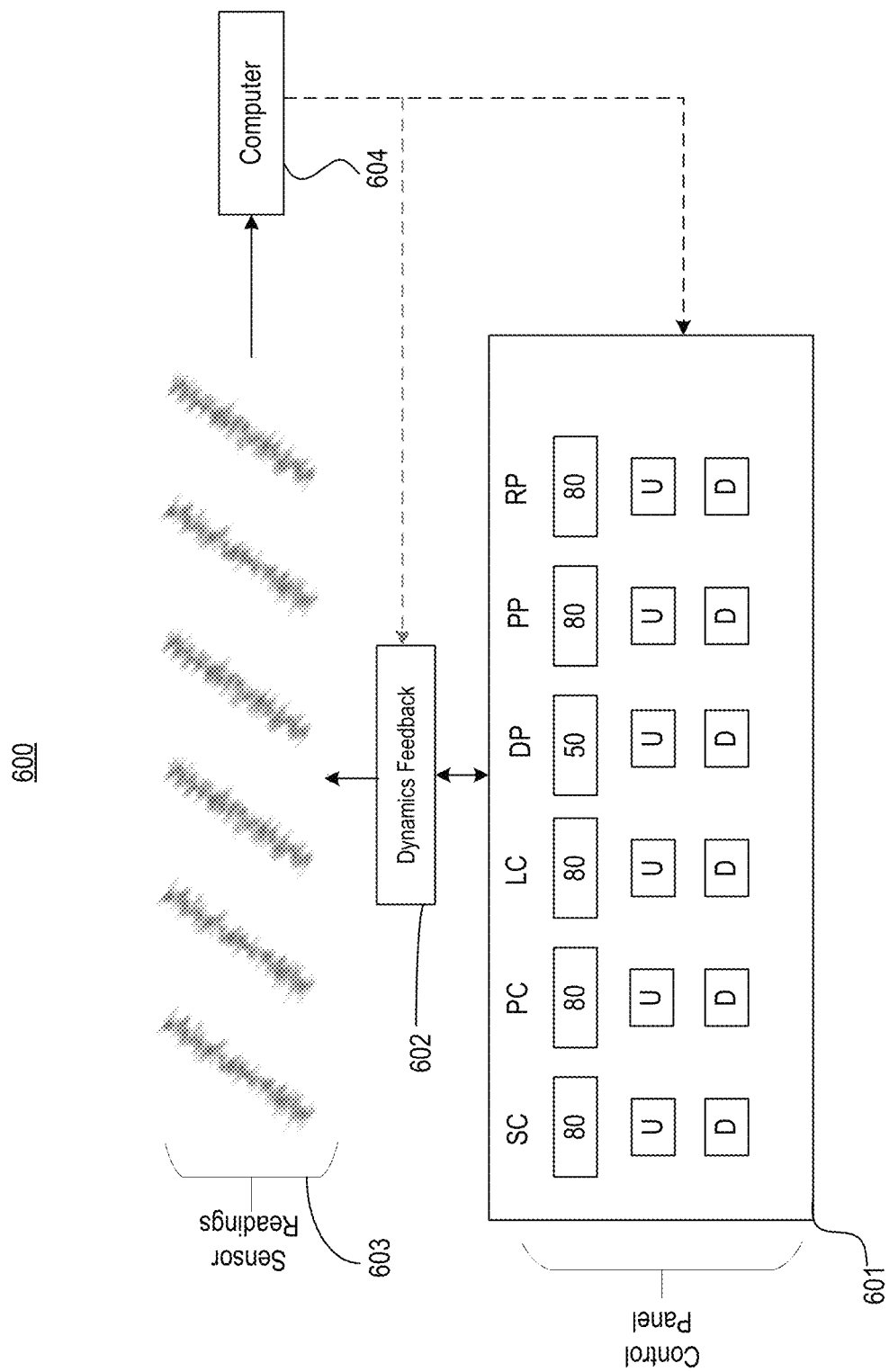
FIG. 6 illustrates a control panel interface with dynamic feedback to optimize differing half-life materials to be placed in the reactor, and to maximize isotope production based on optimal controls of the reactor, in accordance with some embodiments.

FIG. 6 illustrates control system 600 having a control panel interface with dynamic feedback to optimize differing half-life materials to be placed in the reactor, and to maximize isotope production based on optimal controls of the reactor, in accordance with some embodiments. The various components described herein (e.g., components of FIGS. 4-5) are connected to a central controlling unit or reactor console. In some embodiments, control system 600 comprises control panel 601, feedback mechanism 602, sensor readings 603, and analyzer (e.g., computer 604).

In some embodiments, control panel 601 provides the control and monitoring of the reactor. The controls include four control rods (transient, safe, shim and regulating rods); power controller (e.g., flux controller), four operating modes (e.g., auto, manual, pulse, and jump); primary and secondary cooling flow rate, secondary cooling fan speed, and ventilation flow rate, or differential pressure. Here, (SC) refers to safety channel, (PC) refers to percentage channel, (LC) refers to linear/log channel, (DP) refers to demineralizer pump 503, (PP) refers to primary pump 505, and (RP) refers to recirculation pump 507. FIG. 6 is merely an illustration of a control panel, there are additional sensors not illustrated.

The monitors that provide sensor readings 603 include: monitors for power channels (wide-range, log, linear, period, and safety channels); power range monitor; primary and secondary cooling (HX) 506 inlet/outlet temperatures; area radiation monitors (ARMs); reactor bay air particulate and gas monitor; stack air particulate and gas monitor; and primary cooling level and conductivity monitor. Information from control panel 601 is accessible by dynamic feedback mechanism 602 which provides readings 603 from various sensors or monitors to analyzer 604 that analyzes readings 603 to identify any possible anomaly and take corrective action. In some embodiments, dynamic feedback mechanism 602 provides an interface between control panel 601 and analyzer 604 to provide corrective action measures to control panel 601 and/or directly to various components of the reactor system. Here, dynamic refers to adaptive, automatic, and/or real-time change of a parameter in response to an event. In various embodiments, dynamic feedback mechanism 602 provides the ability for reading various sensor values and providing them to computer 604 for analysis. Results of the analysis are then used for dynamic adjustment of one or more knobs for controlling the reactor system to avoid shut down.

For example, sensor readings 603 are analyzed by analyzer or computer 604 in real-time, and corrective measures from analyzer or computer 604 are provided to control panel 601 to adjust movement of any of the control rods, modify operating modes, change the primary and/or secondary cooling flow rates, slow down or speed up cooling fan speed, ventilation rate, and/or differential pressure.

Figure 7:
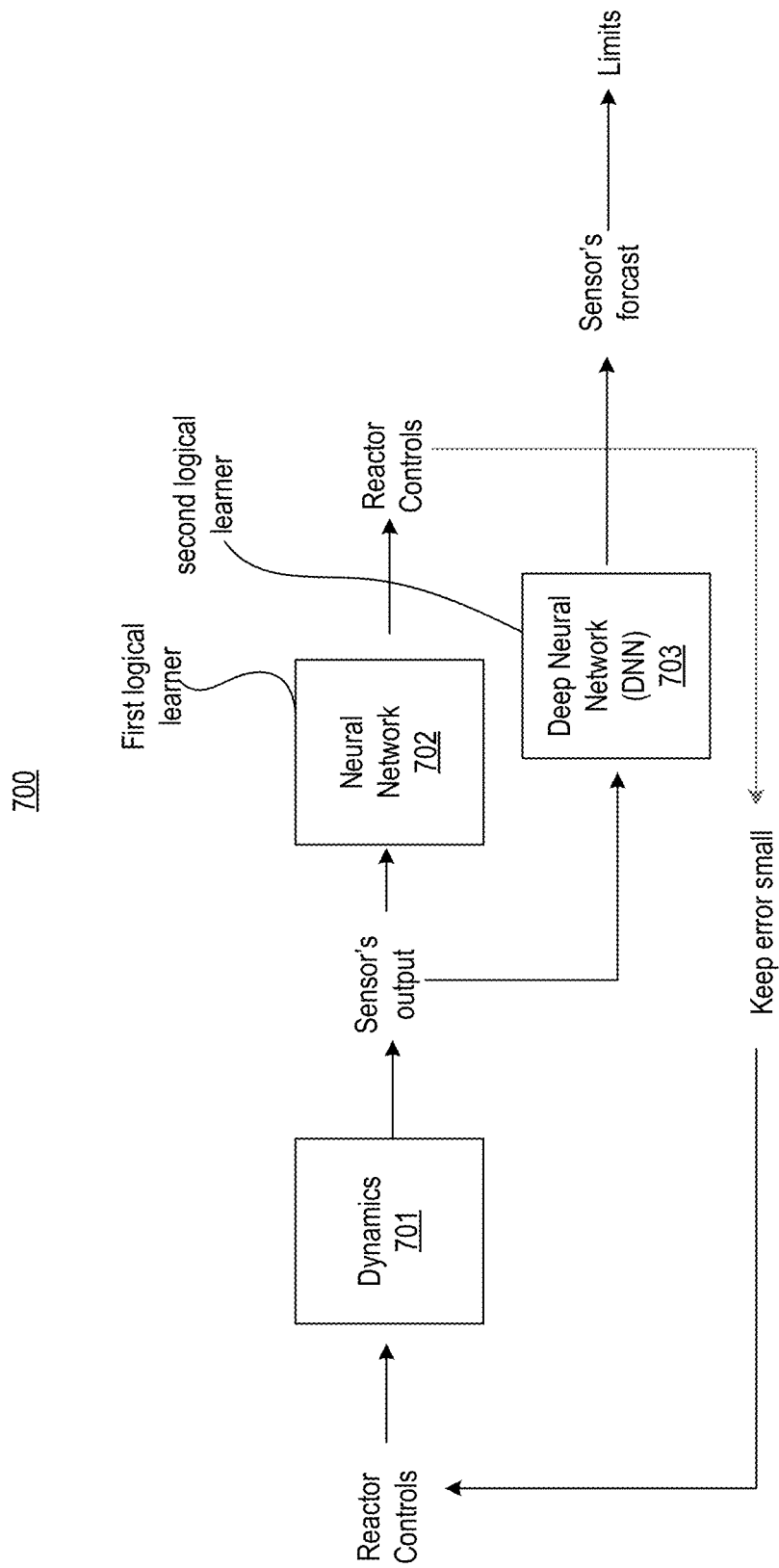
FIG. 7 illustrates a flowchart for optimizing differing half-life materials to be placed in the reactor, and to maximize isotope production based on optimal controls of the reactor, in accordance with some embodiments.

FIG. 7 illustrates flowchart 700 for optimizing differing half-life materials to be placed in the reactor, and to maximize isotope production based on optimal controls of the reactor, in accordance with some embodiments. While various blocks in flowchart 700 are shown in a particular order, the order can be modified. For example, some blocks may be optional, and some blocks may be performed in parallel or out of order. The blocks of various embodiments can be performed by hardware, software, or a combination of them.

The neural controllers keep reactor at steady state. The optimization process uses machine-learning. Machine-learning, which is also referred to herein as statistical analysis, data mining, deep learning, or data analytics, is currently regarded as a subfield of computer science, and many embodiments of machine-learning techniques are known in the art. However, the applicability of machine-learning to tasks not commonly attributed to computer science is widely touted. Through algorithmic methods, machine-learning is able to address complex data tasks. Scientists postulate the data creation or curation from a particular model or they assume an unknown model and apply algorithmic methods to the data to reach conclusions. The latter ensures a data-driven, commonly also referred to as data science, process and supports an innovative way of solving complex data problems.

The optimization process considers initial conditions of the reactor. For example, the process monitors the different sensors to get an intuition of the current state of the reactor. This can be obtained from the console (e.g., control panel 601). Here, equation 1 is being optimized by the optimization tool. This equation is just an example. The embodiments can optimize any equation that is used to improve control of a nuclear reactor. Placement of samples in the reactor is optimized while managing the temperature of the rods. Spatial location of samples determines the flux and energy spectrum. Optimization process also establishes safe limits to avoid monitoring alarms going off, SCRAMs, or penalties.

The optimization process determines the materials that are scheduled to be activated, e.g., Mo-99. Given a set of daily samples (or tasks), samples are introduced in the reactor and irradiate until desired activity is reached (e.g., equilibrium). With these inputs, the optimization process trains a model. The optimization process is intertwined with various components of the reactor.

Generally the problem of sample placement begins with a search space of: (N−1)!/2, where N is the number of samples. If permitted, online sequencing can be optimized beforehand using a suitable algorithm such as a Greedy algorithm. Other examples of optimization methods include: evolutionary algorithms, simulated annealing, and Monte Carlo methods.

The optimization process also controls the reactor by real-time learning-based augmented irradiation control and task optimization. Here, isotope production is optimized using optimal sampling and controls. Reactor is assumed to be in a steady state when this optimization takes place. A person skilled in the art would appreciate that various types of machine-learning schemes may be used. For example, data-driven supervised schemes may be used where patterns are learned by mapping X data set to Y function. Supervised schemes can be shallow machine-learning schemes or deep machine-learning schemes. Examples of a shallow machine-learning scheme include: support vector machines, decision trees, Naïve Bayes, and Neural networks. Examples of a deep machine-learning scheme include: convolutional neural networks, recurrent neural networks, and attention/transformers. The basic idea of these supervised schemes is to find a complex function from the gathered data.

Any one of these machine-learning schemes can be used to learn reactor steady state model with abnormal trends to predict operation. The learned mode provides guidance as based on daily sample loads. The guidance here is to maximize sample irradiation completion ($t_a$) by balancing neutron flux.

The optimization process has multiple objectives or goals. These objectives include learning optimal sample set combinations; and learning reactive behavior as a function of monitoring and controls. Deep learning can learn optimal sequence by mapping monitoring to control variables. For example, predictable patterns are used to find optimal controls while achieving activation time ($t_a$). The end result of this optimization is to suggest changes to the reactor controls and placement of samples to increase productivity.

In some embodiments, neural controllers are used to map four power channels to four control rods (transient, safe, shim and regulating rods). LSTM (long short-term memory) network is used as a fast estimator tool to map saturation rates to forecast behavior.

At steady state, flux Φ is approximately constant, but flux limits have been learned by the optimization tool. The pseudocode for optimizing the operation of the reactor may take the following form:
While keeping the reactor at steady state;
  for a given duration operation time
    propose reactor changes using the network;
  repeat until best duration sequence is found.

One of the components of the optimization process is a learner. The learner learns the sensors and its data, and maps the sensors back to controls. The learner learns all given ranges of normal operation and also learns responses for corrective measures.

Another component of the optimization process is a trainer. The trainer trains another learner that forecasts the behavior of the reactor based on real-time changes, say by 10 seconds. Another component of the optimization process is a technique to place materials of differing half-life in the reactor.

The optimization process can be articulated with a series of steps or operations. In some embodiments, at block 701 the process collects historically representative data from sensors at steady state. Learners 702 and 703 are trained using steady state conditions, as deviation from those conditions may cause the reactor to fail, which are correlated to the operator's action, and informed to the operator. In some embodiments, the process creates two logical learners: first logical learner 702 and a second logical learner 703. In some embodiments, first logical learner 702 (e.g., Neural Network) controls the reactor in real-time, such that if a primary or secondary instrumentation malfunctions, or operator distraction, the operator is informed right away. In some embodiments, second logical learner 703 (e.g., Deep Neural Network (DNN)) forecasts behavior and checks that thresholds are not reached, such that the operator is aware that when, for example, a violation of temperature is going to happen in the next few seconds. Longer projection of future occurrences can likewise be forecast. Both first and second learners 702 and 703, respectively, provide support to the operation to avoid unanticipated shutdowns. It is likewise within the scope of this disclosure that the two learners 702 and 703 are architected as one learner and are trained either jointly or separately. It is likewise within the scope of various embodiments that other learners or additional learners are incorporated.

The optimization process also considers the potential of multiple isotope production. Here, both active and forecasting features of operation in a real complex system are combined. For example, isotope production maximization based on optimal controls, and ability to optimize differing half-live materials activation are combined. As such, the typical "rule of thumb" that is used in practice is augmented by artificial intelligence techniques.

Following is a simplified example: assume duration task for the TRIGA® is to produce 50 grams of aluminum (Al-28) and Vanadium (V-52) and only 3 bins 10 g/each can be used. In this case, Al-27 (abundance-100, σ=0.2E-24 cm$^{-2}$) is converted to Al-28 in $T_{1/2}$=2.3 minutes. V-52 (abundance=99.8, σ=4.5E-24 cm$^{-2}$) is converted to V-52 in $T_{1/2}$=3.8 minutes. Analytically, to achieve saturation (e.g., maximum activation), $t_a$=infinity. However, only a percentage is activated as: $1-e^{-\lambda t_a}=x$, to achieve 95% then $t_a$ is approximately equal to $2.7T_{1/2}$. In this example, to activate to 95%, the following is needed: Al-28=3.7*2.3=8.5 minutes/sample; V-52–3.7*3.8=14.06 minutes/sample. As such, the isotopes are distributed and activated efficiently.

In another example, assuming $t_a(V)=2t_a(Al)$, a human educated sequence of V(1)-V(2)-Al(1), V(1)-V(2)-Al(2), V(3)-V(4)-Al(3), V(3)-V(4)-Al(4), V(5)-Al(5) results in an estimated time of 42 minutes, which is a sub-optimal solution. Conversely, an optimal sequence, obtained from the optimization flow, of V(1)-V(2)-V(3), V(4)-V(5)-Al(1), V(4)-V(5)-Al(2), Al(3)-Al(4)-Al(5) results in estimated time of 36.5 minutes.

The optimization tool of various embodiments is used for optimization of sample location, optimization of schedule for isotope production, and reactor monitoring and control. The optimization tool can be used in United States Department of Energy (USDOE) reactors, research reactors, and power reactors. In power reactors, the optimization tool can be used for monitoring and control, while for research reactors and USDOE reactors, the optimization tool can be used for optimization of schedule for isotope production, and reactor monitoring and control. In addition to activation, learning to control reaction rates have other applications. For example, the optimization tool can be used to control the interaction of neutron with other materials.

Figure 8:
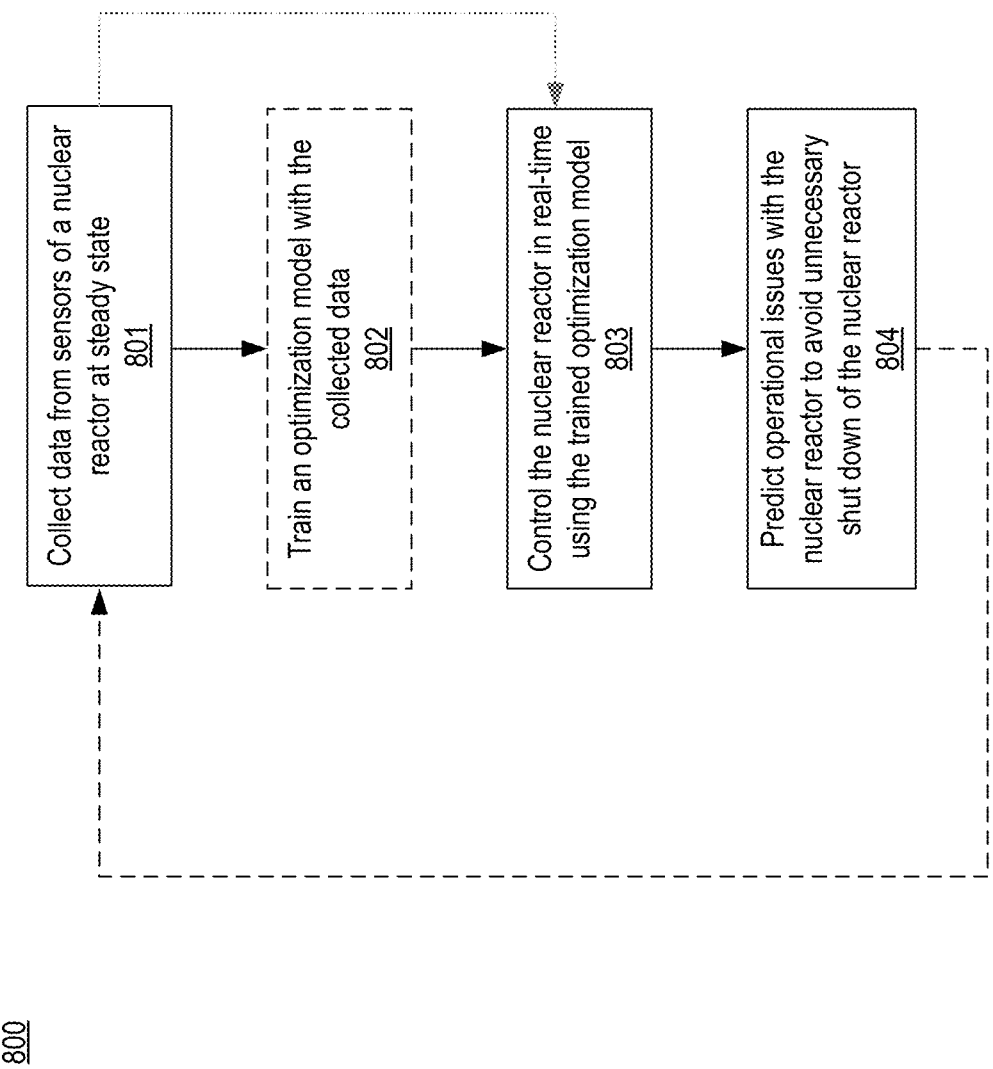
FIG. 8 illustrates a flowchart for optimizing operation of the reactor, in accordance with some embodiments.

FIG. 8 illustrates flowchart 800 for optimizing operation of a nuclear reactor, in accordance with some embodiments. While various blocks in flowchart 800 are shown in a particular order, the order can be modified. For example, some blocks may be optional, and some blocks may be performed in parallel or out of order. The blocks of various embodiments can be performed by hardware, software, or a combination of them.

In some embodiments, a machine-readable storage media is provided having machine readable instructions that, when executed, cause one or more machines to perform a method comprising of collecting data from sensors of a nuclear reactor at a steady state condition, as indicated by block 801. In some embodiments, the sensors include: the heat exchanger inlet and outlet temperature sensors; power range monitor; power channels; area radiation monitors; reactor bay air particulate and gas monitor; and stack air particulate and gas monitor. In some embodiments, the collected data includes: temperature of primary and secondary cooling heat exchanger inlet and outlet; power range; area radiation; reactor bay air particulate and gas; stack air particulate and gas; primary cooling level and conductivity; and data associated with power channels including wide-range channel, log channel, linear channel, period channel, and safety channel.

The method continues with training an optimization model with the collected data as indicated by block 802. In some embodiments, training the optimization model includes applying supervised machine-learning to determine one or more of: placement of a sample material in the reactor; schedule for isotope production from the sample material; and control and monitoring of the reactor. In some embodiments, the optimization model includes equation 1, which is reproduced here:

$$P=N_m\sigma_a(\varphi_{th}+\varphi_{epi}+\varphi_f)(1-e^{-\lambda_m t_a})\qquad \text{eq. 1}$$

where, P is the radioactivity produced (Bq); $N_m$ is the number of target atoms irradiated (#); $\sigma_a$ is the absorption cross section (cm$^2$); $\varphi_{th}$ is the thermal neutron flux (cm$^{-2}$ s$^{-1}$); $\varphi_{epi}$ is the epithermal neutron flux (cm$^{-2}$ s$^{-1}$); $\varphi_f$ is the fast neutron flux (cm$^{-2}$ s$^{-1}$); $\lambda_m$ is the decay constant (s$^{-1}$); and $t_a$ is the activation (irradiation) time (s).

As discussed herein, the training process creates two logical learners: one 702 design to control the reactor in real-time, such that if a primary or secondary instrumentation malfunctions, or operator distraction, the operator is informed right away; and another 703, that forecast behavior and checks that thresholds are not reached, such that the operator is aware that when, for example, a violation of temperature is going to happen in the next few seconds. Both provide support to the operation to avoid unanticipated shutdowns. It is likewise within the scope of this disclosure that the two learners are actually architected as one learner and are trained either jointly or separately.

The method then continues with controlling the nuclear reactor in real-time, using the trained optimization model, and reporting anomalies in the nuclear reactor to an operator as indicated by block 803. In some embodiments, controlling the nuclear reactor in real-time includes one or more of: controlling a power flux controller; moving at least one of four rods, wherein the four rods include transient rod, safe rod, shim rod; and regulating rod; switching between operating modes, wherein the operating modes include auto mode, manual mode, pulse mode, and jump mode; controlling primary and secondary cooling flow rate; controlling secondary cooling fan speed; or controlling ventilation flow rate or differential pressure.

While controlling the reactor in real-time solves the urgent need at hand, the method also proceeds to predict operational issues with the nuclear reactor to avoid unnecessary shut down of the nuclear reactor as indicated by block 804. In some embodiments, once the optimization model is trained, the trained model can infer the controls of the nuclear reactor and prediction of operational issues by processing the collected data. In one such embodiment, the trained model is saved in memory and reused. The optimization model can be retrained regularly if more sensors are added (or if any sensor is taken down). An operator can control how frequently the optimization model needs to be re-trained.

Figure 9:
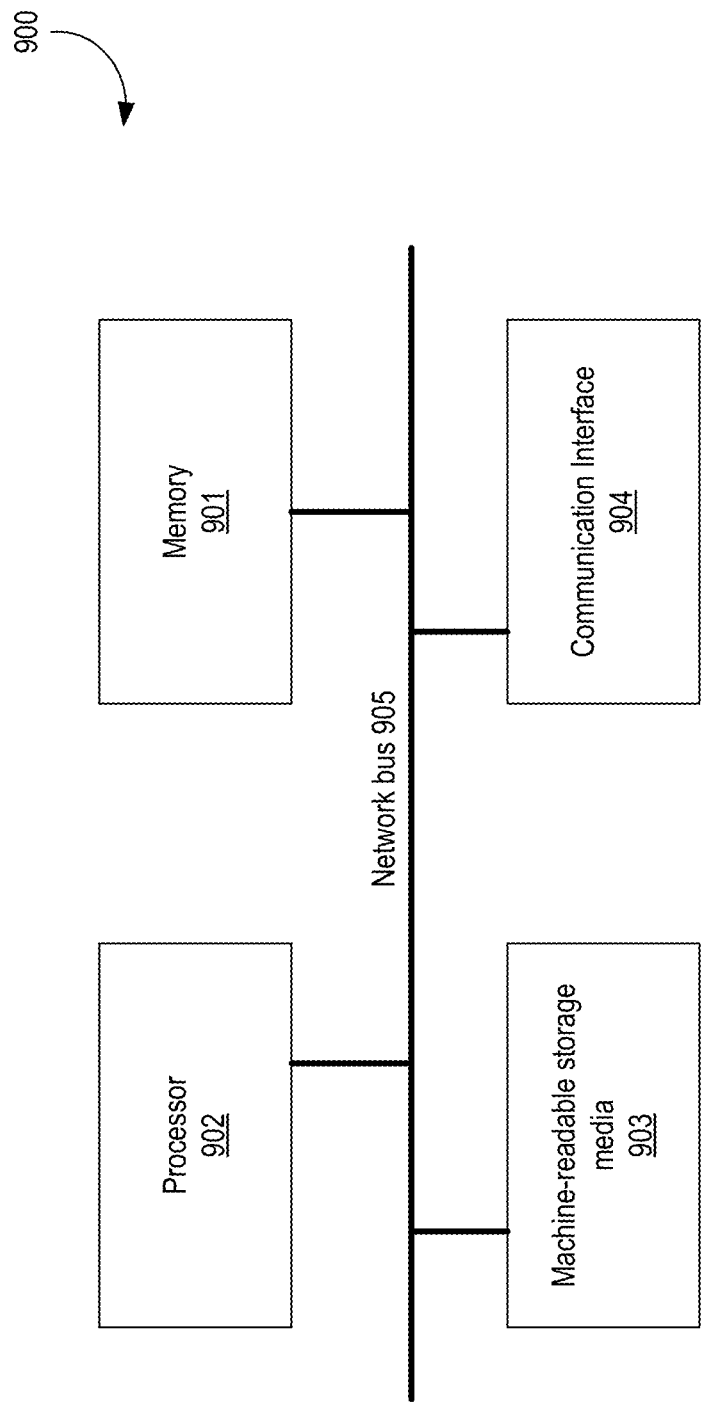
FIG. 9 illustrates a computer system to optimize differing half-life materials to be placed in the reactor, and to maximize isotope production based on optimal controls of the reactor, in accordance with some embodiments.

FIG. 9 illustrates computer system 900 to optimize differing half-life materials to be placed in the reactor, and to maximize isotope production based on optimal controls of the reactor, in accordance with some embodiments. Elements of embodiments are also provided as a machine-readable medium (e.g., memory) for storing the computer-executable instructions (e.g., instructions to implement any other processes discussed herein). In some embodiments, computing platform 900 comprises memory 901, processor 902, machine-readable storage media 903 (also referred to as tangible machine readable medium), communication interface 904 (e.g., wireless or wired interface), and network bus 905 coupled together as shown.

In some embodiments, processor 902 is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of system 900 are coupled together via network bus 905. Any suitable protocol may be used to implement Network Bus 905. In some embodiments, machine-readable storage medium 901 includes instructions (also referred to as the program software code/instructions) for controlling a nuclear reactor and optimizing a complex set of variables to produce one to several radio isotopes concurrently as described with reference to various embodiments and flowchart.

Program software code/instructions associated with the flowcharts (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with the flowcharts (and/or various embodiments) are executed by system 900.

In some embodiments, the program software code/instructions associated with the flowchart(s) (and/or various embodiments) are stored in a computer executable storage medium 903 and executed by processor 902. Here, computer executable storage medium 903 is a tangible machine-readable medium that can be used to store program software code/instructions and data that, when executed by a computing device, causes one or more processors (e.g., processor 902) to perform a method(s) as may be recited in one or more accompanying claims directed to the disclosed subject matter.

The tangible machine readable medium 903 may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with the flowchart(s) and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 903 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 903 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Nexus®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

Arrangements may be shown in block diagram form to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details are set forth to describe example embodiments of the disclosure, it should be apparent to one skilled in the art that the disclosure can be practiced without, or with variation of, these specific details. The description is thus to be regarded as illustrative instead of limiting.

Various embodiments are described as examples. These examples can be combined with any other example in any suitable manner. For example, example 1 can be combined with example 5, and example 4 can be combined with example 2.

Example 1: A machine-readable storage media having machine-readable instructions that, when executed, cause one or more machine to perform an operation comprising: collect data from sensors of a nuclear reactor at a steady state condition; train an optimization model with the collected data; control the nuclear reactor in real-time, using the trained optimization model, and report anomalies in the nuclear reactor to an operator; and predict operational issues with the nuclear reactor to avoid unplanned shut down of the nuclear reactor.

Example 2: The machine-readable storage media of example 1, wherein to control the nuclear reactor in real-time includes one or more of: controlling a power flux controller; moving at least one of four rods, wherein the four rods include transient rod, safe rod, shim rod; and regulating rod; switching between operating modes, wherein the operating modes include auto mode, manual mode, pulse mode, and jump mode; controlling primary and secondary cooling flow rate; controlling secondary cooling fan speed; or controlling ventilation flow rate or differential pressure.

Example 3: The machine-readable storage media of example 1, wherein to train an optimization model includes applying supervised machine-learning to determine one or more of: placement of a sample material in the reactor; schedule for isotope production from the sample material; or control and monitoring of the reactor.

Example 4: The machine-readable storage media of example 1, wherein the optimization model includes: $P = N_m \sigma_a (\varphi_{th} + \varphi_{epi} + \varphi_f)(1 - e^{-\lambda_m t_a})$ where, P is radioactivity produced (Bq); $N_m$ is a number of target atoms irradiated (#); $\sigma_a$ is an absorption cross section (cm$^2$); $\phi_{th}$ is a thermal neutron flux (cm$^{-2}$ s$^{-1}$); $\phi_{epi}$ is an epithermal neutron flux (cm$^{-2}$ s$^{-1}$) $\phi_f$ is a fast neutron flux (cm$^{-2}$ s$^{-1}$); $\lambda_m$ is a decay constant (s$^{-1}$); and $t_a$ is an activation (irradiation) time (s).

Example 5: The machine-readable storage media of example 1, wherein the collected data includes: a temperature of primary and secondary cooling heat exchanger inlet and outlet; a power range; an area radiation; a reactor bay air particulate and gas; a stack air particulate and gas; a primary cooling level and conductivity; and data associated with power channels including wide-range channel, log channel, linear channel, period channel, and safety channel.

Example 6: The machine-readable storage media of example 1, wherein the sensors include: temperature sensors of heat exchanger inlet and outlet; a power range monitor; power channels; area radiation monitors; a reactor bay air particulate and gas monitor; and a stack air particulate and gas monitor.

Example 7: The machine-readable storage media of example 1, wherein the nuclear reactor is configured for the production of Mo-99.

Example 8: The machine-readable storage media of example 1, wherein the nuclear reactor is a research or test reactor.

Example 9: The machine-readable storage media of example 1, wherein to train the optimization model comprises applying a deep learner.

Example 10: An apparatus comprising: a control panel to collect data from sensors of a nuclear reactor at a steady state condition; and an analyzer communicatively coupled to the control panel, wherein the analyzer is to train an optimization model with the collected data, and to predict operational issues with the nuclear reactor to avoid unplanned shut down of the nuclear reactor, wherein the analyzer communicates with the control panel to control the nuclear reactor in real-time, using the trained optimization model, and to report anomalies in the nuclear reactor to an operator.

Example 11: The apparatus of example 10, wherein the control panel is to control the nuclear reactor in real-time by control of a power flux controller.

Example 12: The apparatus of example 10, wherein the control panel is to control the nuclear reactor in real-time by movement of at least one of four rods, wherein the four rods include transient rod, safe rod, shim rod; and regulating rod.

Example 13: The apparatus of example 10, wherein the control panel is to control the nuclear reactor in real-time by switching between operating modes, wherein the operating modes include auto mode, manual mode, pulse mode, and jump mode.

Example 14: The apparatus of example 10, wherein the control panel is to control the nuclear reactor in real-time by control of primary and secondary cooling flow rate.

Example 15: The apparatus of example 10, wherein the control panel is to control the nuclear reactor in real-time by control of a secondary cooling fan speed.

Example 16: The apparatus of example 10, wherein the control panel is to control the nuclear reactor in real-time by control of ventilation flow rate or differential pressure.

Example 17: The apparatus of example 10, wherein the nuclear reactor is configured for the production of Mo-99.

Example 18: The apparatus of example 10, wherein the nuclear reactor is a research or test reactor.

Example 19: The apparatus of example 10, wherein the analyzer is to train the optimization model via a deep learner.

Example 20: A method for controlling a nuclear reactor, the method comprising: collecting data from sensors of a nuclear reactor at a steady state condition; training an optimization model with the collected data; dynamically controlling the nuclear reactor in real-time, using the trained optimization model, and reporting anomalies in the nuclear reactor to an operator.

Example 21: The method of example 20 further comprising: predicting operational issues with the nuclear reactor to avoid unplanned shut down of the nuclear reactor.

Example 22: The method of example 20, wherein controlling the nuclear reactor in real-time includes one or more of: controlling a power flux controller; moving at least one of four rods, wherein the four rods include transient rod, safe rod, shim rod; and regulating rod; switching between operating modes, wherein the operating modes include auto mode, manual mode, pulse mode, and jump mode; controlling primary and secondary cooling flow rate; controlling secondary cooling fan speed; or controlling ventilation flow rate or differential pressure.

Example 23: The method of example 20, wherein training the optimization model includes applying supervised machine-learning to determine one or more of: placement of a sample material in the reactor; schedule for isotope production from the sample material; or control and monitoring of the reactor.

Example 24: The method of example 20, wherein the optimization model includes: $P = N_m \sigma_a (\varphi_{th} + \varphi_{epi} + \varphi_f)(1 - e^{-\lambda_m t_a})$, where, P is a radioactivity produced (Bq); $N_m$ is a number of target atoms irradiated (#); $\sigma_a$ is an absorption cross section (cm$^2$); $\phi_{th}$ is a thermal neutron flux (cm$^{-2}$ s$^{-1}$); $\phi_{epi}$ is an epithermal neutron flux (cm$^{-2}$ s$^{-1}$); $\phi_f$ is a fast neutron flux (cm$^{-2}$ s$^{-1}$); $\lambda_m$ is a decay constant (s$^{-1}$); and $t_a$ is an activation (irradiation) time (s).

Example 25: The method of example 20, wherein the collected data includes: temperature of primary and secondary cooling heat exchanger inlet and outlet; power range; area radiation; reactor bay air particulate and gas; stack air particulate and gas; primary cooling level and conductivity;

and data associated with power channels including wide-range channel, log channel, linear channel, period channel, and safety channel.

Example 26: The method of example 20, wherein the sensors include: temperature sensors of heat exchanger inlet and outlet; power range monitor; power channels; area radiation monitors; reactor bay air particulate and gas monitor; and stack air particulate and gas monitor.

Example 27: The method of example 20, wherein the nuclear reactor is configured for the production of Mo-99.

Example 28: The method of example 20, wherein the nuclear reactor is a research or test reactor.

Example 29: The method of example 20, wherein training the optimization model comprises applying a deep learner.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A machine-readable storage medium having machine-readable instructions that, when executed, cause one or more machines to perform a method to improve an operation of a nuclear reactor by monitoring an alarm threshold to prevent unplanned shutdown of the nuclear reactor to increase an isotope production, the method comprising:
    collecting data from sensors of the nuclear reactor at a steady state condition;
    training an optimization model with multiple objectives using the collected data, wherein the optimization model uses one or more machine-learning algorithms configured to:
        learn patterns by mapping the collected data to a set of controls of the nuclear reactor, wherein the set of controls are associated with a control panel of the nuclear reactor, wherein the set of controls include one or more controls to: adjust movement of a control rod, modify operating modes, change primary cooling flow rate, change secondary cooling flow rate, adjust cooling fan speed, adjust ventilation rate, or adjust differential pressure; and
        learn a setting of the set of controls that increases the isotope production from the predicted learned patterns;
    reporting whether an output from the sensors of the nuclear reactor is above or below the alarm threshold; and
    predicting, by processing the collected data via the trained optimization model, operational issues with the nuclear reactor to avoid the unplanned shutdown of the nuclear reactor to increase the isotope production, wherein training the optimization model comprises applying one or more supervised machine-learning algorithms by analyzing and learning the collected data to:
        determine a location for placement of a sample in the nuclear reactor;
        schedule for the isotope production from the sample; and
        adjust the set of controls, via application of the trained optimization model by a computer, to reduce disruption of the schedule which in turn minimizes the unplanned shutdowns of the nuclear reactor to increase the isotope production.

2. The machine-readable storage medium of claim 1, wherein the control rod includes one of a transient rod, a safe rod, a shim rod, and/or a regulating rod; and wherein the operating modes include auto mode, manual mode, pulse mode, and jump mode.

3. The machine-readable storage medium of claim 1, wherein the optimization model applies one or more parameters which include at least one of:
    radioactivity produced; a number of target atoms irradiated an absorption cross section; a thermal neutron flux; an epithermal neutron flux; a fast neutron flux; a decay constant; or an activation or irradiation time.

4. The machine-readable storage medium of claim 1, wherein the collected data includes:
    a temperature of primary and secondary cooling heat exchanger inlet and outlet;
    a power range;
    an area radiation;
    a reactor bay air particulate and gas;
    a stack air particulate and gas;
    a primary cooling level and conductivity; and
    data associated with power channels including wide-range channel, log channel, linear channel, period channel, and safety channel.

5. The machine-readable storage medium of claim 1, wherein the sensors include:
    temperature sensors of heat exchanger inlet and outlet;
    a power range monitor;
    power channels;
    area radiation monitors;
    a reactor bay air particulate and gas monitor; and
    a stack air particulate and gas monitor.

6. The machine-readable storage medium of claim 1, wherein the nuclear reactor is configured for a production of Mo-99.

7. The machine-readable storage medium of claim 1, wherein the nuclear reactor is a research or test reactor.

8. The machine-readable storage medium of claim 1, wherein to train the optimization model comprises applying a deep learner.

9. A method to improve an operation of a nuclear reactor by monitoring an alarm threshold to prevent unplanned shutdown of the nuclear reactor to increase an isotope production, the method comprising:
    collecting data from sensors of the nuclear reactor at a steady state condition;
    training an optimization model with multiple objectives using the collected data, wherein the optimization model uses one or more machine-learning algorithms configured to:
        learn patterns by mapping the collected data to a set of controls variables of the nuclear reactor, wherein the set of controls is associated with a control panel of the nuclear reactor, wherein the set of controls include one or more controls to: adjust movement of a control rod, modify operating modes, change primary cooling flow rate, change secondary cooling flow rate, adjust cooling fan speed, adjust ventilation rate, or adjust differential pressure; and
        learn the set of controls that increases the isotope production from the learned patterns;
    reporting whether an output from the sensors of the nuclear reactor is above or below the alarm threshold; and
    predicting, by processing the collected data via the trained optimization model, operational issues with the nuclear reactor to avoid the unplanned shutdown of the nuclear reactor to increase the isotope production, wherein training the optimization model comprises applying one or more supervised machine-learning algorithms by analyzing and learning the collected data to:
  determine a location for placement of a sample in the nuclear reactor;
  schedule for the isotope production from the sample; and
  adjust the set of controls, via application of the trained optimization model by a computer, to reduce disruption of the schedule which in turn reduces the unplanned shutdowns of the nuclear reactor to increase the isotope production.

10. The method of claim 9, wherein the sensors include:
temperature sensors of a heat exchanger inlet and outlet;
a power range monitor;
power channels;
area radiation monitors;
a reactor bay air particulate and gas monitor; and
a stack air particulate and gas monitor.

* * * * *

UNITED STATES PATENT AND TRADEMARK OFFICE
CERTIFICATE OF CORRECTION

| | | |
|---|---|---|
| PATENT NO. | : 12,106,865 B2 | Page 1 of 1 |
| APPLICATION NO. | : 17/236852 | |
| DATED | : October 1, 2024 | |
| INVENTOR(S) | : Steven R. Reese, Ophir Frieder and Mario Enrique Gomez Fernandez | |

It is certified that error appears in the above-identified patent and that said Letters Patent is hereby corrected as shown below:

On the Title Page

Item (71) Applicant: Oregon State University, Corvallis, OR (US), add and Georgetown University, Washington, DC Item (73) Assignee: Oregon State University, Corvallis, OR (US), add and Georgetown University, Washington, DC Signed and Sealed this
Twenty-second Day of April, 2025

Coke Morgan Stewart
*Acting Director of the United States Patent and Trademark Office*